(12) United States Patent
Müller

(10) Patent No.: US 8,501,311 B2
(45) Date of Patent: Aug. 6, 2013

(54) REAR-ILLUMINABLE AIRCRAFT INTERIOR COMPONENT

(75) Inventor: Tanja Müller, Blaustein (DE)

(73) Assignee: Airbus Deutschland GmbH, Hamburg (DE)

( * ) Notice: Subject to any disclaimer, the term of this patent is extended or adjusted under 35 U.S.C. 154(b) by 813 days.

(21) Appl. No.: 11/970,160

(22) Filed: Jan. 7, 2008

(65) Prior Publication Data

US 2008/0166544 A1    Jul. 10, 2008

Related U.S. Application Data

(60) Provisional application No. 60/884,235, filed on Jan. 10, 2007.

(30) Foreign Application Priority Data

Jan. 10, 2007   (DE) .......................... 10 2007 001 578

(51) Int. Cl.
    *B32B 5/16* (2006.01)
(52) U.S. Cl.
    USPC ............................. 428/323; 428/324; 428/328
(58) Field of Classification Search
    USPC .......................................... 428/323, 324, 328
    See application file for complete search history.

(56) References Cited

U.S. PATENT DOCUMENTS

| 5,731,374 A * | 3/1998 | Good et al. | 524/444 |
| 6,092,915 A * | 7/2000 | Rensch | 362/471 |
| 2002/0011040 A1 * | 1/2002 | Adachi et al. | 52/204.597 |
| 2002/0076546 A1 * | 6/2002 | Johnson | 428/324 |
| 2002/0145081 A1 | 10/2002 | Lau et al. | |
| 2003/0004600 A1 * | 1/2003 | Priedeman, Jr. | 700/119 |
| 2003/0018118 A1 | 1/2003 | Burnett | |
| 2003/0021961 A1 * | 1/2003 | Ylitalo et al. | 428/195 |
| 2003/0027919 A1 * | 2/2003 | Fritz | 524/494 |
| 2003/0162912 A1 * | 8/2003 | Disch et al. | 525/539 |
| 2004/0075639 A1 | 4/2004 | Lester et al. | |
| 2004/0116554 A1 * | 6/2004 | Karunaratne et al. | 523/171 |
| 2005/0142968 A1 * | 6/2005 | Cushing et al. | 442/136 |
| 2005/0252416 A1 * | 11/2005 | Venturini et al. | 106/403 |
| 2006/0125143 A1 * | 6/2006 | Donea et al. | 264/176.1 |
| 2006/0177639 A1 * | 8/2006 | Elzen et al. | 428/213 |
| 2006/0237122 A1 * | 10/2006 | Dhawan et al. | 156/244.11 |

FOREIGN PATENT DOCUMENTS

| DE | 3814853 | 11/1988 |
| DE | 4322242 | 1/1995 |
| DE | 10215559 | 10/2003 |
| EP | 0299687 | 1/1989 |
| WO | 2008021673 | 2/2008 |

* cited by examiner

*Primary Examiner* — Callie Shosho
*Assistant Examiner* — Samir Shah
(74) *Attorney, Agent, or Firm* — Wood, Herron & Evans, LLP

(57) ABSTRACT

The present invention relates to a rear-illuminable aircraft interior component consisting of a transparent or translucent thermoplastic, a translucent varnish layer disposed on the latter and a decorative varnish layer disposed on the translucent varnish layer, as well as the use of a rear-illuminable aircraft interior component of this kind as a rear-illuminable aircraft window ring.

18 Claims, 1 Drawing Sheet

REAR-ILLUMINABLE AIRCRAFT INTERIOR COMPONENT

TECHNICAL FIELD

The present invention relates to a rear-illuminable aircraft interior component consisting of a transparent or translucent thermoplastic, a translucent varnish layer disposed on the latter and a decorative varnish layer disposed on the translucent varnish layer. The present invention also relates to the use of a rear-illuminable aircraft interior component of this kind as a rear-illuminable aircraft window ring.

BACKGROUND

As a rule the rear-illuminable components which are usually used in the interior of aircraft consist of a partially light-transmitting (translucent) plastics material such as, for example, a thermoplastic which is flight-approved. However, on account of their basic colour, these rear-illuminable components frequently present an exterior of little attractiveness without rear illumination. Thus, for example, decorative rings of aircraft windows which are made of a conventional thermoplastic of this kind can be of a dark colour and stand out against the surroundings in a visually disturbing manner when not illuminated from the rear.

The object of the present invention is therefore to provide a rear-illuminable aircraft interior component which, even when not illuminated from the rear, has a visually pleasing appearance and, in particular, cannot, or not easily, be recognised as a rear-illuminable aircraft interior component.

SUMMARY OF THE INVENTION

This object is achieved according to the invention by a rear-illuminable aircraft interior component which consists of a transparent or translucent thermoplastic, a translucent varnish layer disposed on the latter and a decorative varnish layer disposed on the translucent varnish layer.

The use of a combined varnish system of a translucent varnish layer and a decorative varnish layer surprisingly enables the aircraft interior component according to the invention not to be translucent and to be of a desired hue when not illuminated from the rear, although to let sufficient light through to obtain the desired rear illumination effect when illuminated from the rear. The aircraft interior component according to the invention can in particular be transilluminated on one side, in which case an object lying behind cannot be detected. In other words, the aircraft interior component according to the invention is an effectively varnished decorative element and/or one which is well adapted to the surroundings when not illuminated from the rear and has a particular visual emphasis when illuminated from the rear. The appearance of the aircraft interior component when not illuminated from the rear can be selected from design aspects and/or adapted to the surroundings through an appropriate choice of decorative varnish layer as well as translucent varnish layer. The decorative varnish layer may, for example, be of a metal-effect hue, which is currently much in demand, or of a different hue such as, for instance, white or beige. The decorative varnish layer additionally provides the relatively susceptible transparent or translucent thermoplastic with a scratch-resistant covering and therefore protects this against mechanical damage.

According to the present invention, any thermoplastic which is known in the prior art can be used as the transparent or translucent thermoplastic, provided that this is partially or completely light-transmitting and can be brought into a predetermined form by a known method such as injection moulding or thermoforming. If used in the aircraft interior area, the stringent fire protection requirements which are prescribed for aircraft cabins must in addition be met.

A transparent or translucent thermoplastic which is preferred within the scope of the present invention is a polyphenylsulphone (PPSU) thermoplastic. An example of a particularly suitable thermoplastic is the EUROPLEX® PPSU material sold by the firm Röhm GmbH in the form of a sheet or plate, which is a flight-approved plastics material.

The translucent varnish layer of the rear-illuminable aircraft interior component according to the invention is preferably produced by applying a translucent, solvent-containing two-component polyurethane varnish (translucent, solvent-containing 2C-PUR-varnish; called translucent varnish in the following) which comprises a binder, a hardener, a solvent, as well as an inorganic pigment, a refractive component and optionally a glossy pigment as further constituents. In the case of a two-component varnish of this kind the hardener component is provided separately from the base varnish and only admixed before use, whereby the ready-to-use translucent varnish is obtained.

The translucent varnish is preferably based on a polyol as binder, a polyisocyanate as hardener and a suitable solvent. The polyol and the polyisocyanate form a polyurethane polymer during hardening through a polyaddition reaction. However the solvent serves solely to make the varnish processable, takes no part in the film formation as a reaction partner and evaporates when the varnish dries and hardens. Polyols which are particularly suitable are polyacrylate resins, polyesters or polyethers containing hydroxyl groups. Aromatic or aliphatic polyisocyanates are particularly suitable hardeners. Suitable solvents include esters, alcohols, in particular low-boiling alcohols, aromatic or aliphatic hydrocarbons, ketones and mixtures thereof. The solvent may optionally also contain water. However in this case the polyol and the hardener must be modified so as to be emulsifiable in water, which can be achieved, for example, by modifying the polyols by means of carboxyl groups or amines. The proportion of solvent in the ready-to-use translucent varnish usually lies in the range from 45 to 70 wt. %. A person skilled in the art in the field of polyurethane varnishes is familiar with or can directly establish suitable combinations of binders, hardeners and solvents.

The inorganic pigment which is contained in the translucent varnish preferably has a high refractive index of above 2.5, in particular a refractive index in the range from 2.5 to 3.5, more preferably in the range from 2.5 to 3.1, particularly preferably in the range from 2.6 to 2.9. The particle size of the inorganic pigment preferably lies in the range from 0.05 to 2.0 µm, in particular in the range from 0.2 to 1.0 µm. The inorganic pigment can be a white, black or coloured pigment. The inorganic pigment is preferably the white pigment titanium dioxide, in particular the titanium dioxide modification rutile, which is thermally stable and resistant and has a high refractive index and therefore a high colouring and covering power. It is particularly preferable to use titanium dioxide (rutile) with a refractive index of approximately 2.71 and a particle size of 0.2 to 1.0 µm. The pigment is preferably contained in a quantity of less that 5 wt. %, in particular in a quantity of less than 2.5 wt. %, related to the total weight of the translucent varnish.

The refractive component preferably has a refractive index between 1.3 and 2.4, in particular between 1.5 and 2.1, more preferably between 1.7 and 2.0, particularly preferably between 1.8 and 1.9. The refractive index of the refractive component is most preferably 1.84. The refractive component has a particle size which preferably lies in the range from 2.5 to 10 µm, in particular in the range from 3.5 to 6.0 µm, more preferably in the range from 4.0 to 5.5 µm, and particularly preferably in the range from 4.5 to 5.0 µm. Glass particles, for example, can be used as the refractive component, in which case the glass is preferably an industrial glass such as, for example, a soda-lime-silicate glass, which can contain one or more additive(s) such as lead oxide, alkaline earth metal oxides, etc. It is particularly preferable to use glass particles with a refractive index of 1.84 and a particle size of 4.71 µm as the refractive component. The refractive component is usually contained in the translucent varnish in a quantity of 0.1 to 10 wt. % in particular in a quantity of 0.1 to 5 wt. %, related to the total weight of the translucent varnish.

The property of the translucent varnish layer of letting sufficient light through and yet being translucent when illuminated from the rear is due to the use of an inorganic pigment with a good covering power, i.e. high refractive index, and a relatively small particle size as well as a refractive component with a refractive index which is lower and a particle size which is larger when compared with the inorganic pigment. For example, the combination of titanium dioxide (rutile) with a particle size of 0.1 to 1.0 µm and a refractive index of approximately 2.71 and glass particles with a particle size in the range from 4.5 to 5.0 µm, in particular a particle size of 4.71 µm, and a refractive index of 1.5 to 2.1, in particular 1.84, is preferred within the scope of the present invention.

According to one preferred embodiment of the present invention, the translucent varnish also comprises a glossy pigment. A glossy pigment within the meaning of the present invention is a pigment which gives the translucent varnish a certain gloss effect through directed reflection at pigment particles which are predominantly formed and oriented in a planar manner and are highly refractive.

The glossy pigment is preferably of a material which contains mica, such as titanium dioxide mica, or consists of a mica. The glossy pigment preferably has a particle size of less than 60 µm. It is particularly preferable for 90% or more of the glossy pigment particles to have a particle size of less than 40 µm. The glossy pigment is usually contained in the translucent varnish in a quantity of 0.1 to 10 wt. %, in particular in a quantity of 0.1 to 5 wt.%, related to the total weight of the translucent varnish.

The translucent varnish can also contain one or more filler(s). One or more additive(s) may also be contained in addition, this/these being added to the varnish in small quantities in order to improve or to modify one or more property/properties. Examples of this/these include wetting agents, dispersants, rheologically active auxiliary agents, light protection additives, etc. A person skilled in the art in the field of varnish production is very familiar with suitable additives and fillers.

The translucent varnish layer enables the aircraft interior component according to the invention to be uniformly illuminated from the rear. Thus when using, for example, a punctual light source such as an LED, the translucent varnish layer guarantees planar or diffuse illumination. The translucent varnish layer is partially light-transmitting, chemically resistant and exhibits excellent adhesiveness to plastics materials as well as excellent flexibility. Depending on the composition of the translucent varnish which is used, the translucent varnish layer which is produced with this is in addition of low combustibility and flammability.

The decorative varnish layer of the rear-illuminable aircraft interior component according to the invention is preferably produced by applying a solvent-containing metallic two-component polyurethane varnish (solvent-containing metallic 2C-PUR-varnish; called decorative varnish in the following) which comprises a binder, a hardener, a solvent, as well as a metal pigment and optionally a pearlescent pigment as further constituents. In the case of a two-component varnish of this kind the hardener component is provided separately from the base varnish and only admixed before use, whereby the ready-to-use polyurethane varnish is obtained.

The decorative varnish is preferably based on a polyol as binder, a polyisocyanate as hardener and a suitable solvent. The polyol and the polyisocyanate form a polyurethane polymer during hardening through a polyaddition reaction. However the solvent serves solely to make the varnish processable, takes no part in the film formation as a reaction partner and evaporates when the varnish dries and hardens. Polyols which are particularly suitable are polyacrylate resins, polyesters or polyethers containing hydroxyl groups. Aromatic or aliphatic polyisocyanates are particularly suitable hardeners. Suitable solvents include esters, alcohols, in particular low-boiling alcohols, aromatic or aliphatic hydrocarbons, ketones and mixtures thereof. The solvent may optionally also contain water. However in this case the polyol and the hardener must be modified so as to be emulsifiable in water, which can be achieved, for example, by modifying the polyols by means of carboxyl groups or amines. The proportion of solvent in the ready-to-use decorative varnish usually lies in the range from 45 to 70 wt. %. A person skilled in the art in the field of polyurethane varnishes is familiar with or can directly establish suitable combinations of binders, hardeners and solvents.

The metal pigment which is contained in the decorative layer preferably consists of aluminium, copper, gold bronze (copper-zinc alloy), silver, gold, cobalt, titanium, tin or of mixtures of two or more of the above-mentioned substances. A particularly preferred metal pigment is aluminium powder. The particle size of the metal pigment is preferably less than 100 µm, in particular less than 50 µm, particularly preferably less than 25 µm. The proportion of metal pigment is 0.1 to 30 wt. %, preferably 1.0 to 20 wt. %, in particular 1.0 to 10 wt. %, related to the total weight of the decorative varnish. The metal pigments are as a rule present as metal particles in the form of platelets, which take up a plane-parallel arrangement in the varnish and behave like a large number of small mirrors. A metal-effect decorative varnish which is particularly attractive visually can be obtained by selecting a certain metal pigment.

According to one preferred embodiment of the present invention, the decorative varnish also comprises a pearlescent pigment. A pearlescent pigment within the meaning of the present invention is a pigment which as a rule consists of colourless, transparent and highly refractive pigment platelets. Following parallel orientation in the applied decorative varnish, a "soft" gloss effect, called pearlescence, is produced through multiple reflection. Preferred examples of a pearlescent pigment according to the invention include various micas such as, for example, muscovite. Another preferred example is titanium dioxide mica. The particle size of the pearlescent pigment preferably lies in the range from 5 to 100 µm, in particular in the range from 10 to 60 µm. The pearlescent pigment is usually present in the decorative varnish in a quantity of 0.1 to 10 wt. %, in particular in a quantity of 0.1 to 5 wt. %, related to the total weight of the decorative varnish.

The decorative varnish can also contain one or more filler(s). One or more additive(s) may also be contained in addition, this/these being added to the varnish in small quantities in order to improve or to modify one or more property/properties. Examples of this/these include wetting agents, dispersants, rheologically active auxiliary agents, light protection additives, etc. A person skilled in the art in the field of varnish production is very familiar with suitable additives and fillers.

According to another preferred embodiment, the decorative varnish which is used within the scope of the present invention is of a certain hue, in particular a light colour such as white or beige, etc., as a colour of this kind can be well integrated into the surroundings, in particular an aircraft cabin. In this case the metal pigment is replaced by a corresponding different organic or inorganic pigment. A person skilled in the art in the field of varnishes is familiar with the measures which are required for this purpose.

The decorative varnishes which are used within the scope of the present invention can be configured through methods with which the person skilled in the art is familiar as smooth or structured variants which result in a smooth or structured surface of the rear-illuminable aircraft interior component according to the invention.

The decorative varnish layer gives the rear-illuminable aircraft interior component according to the invention an attractive hue and/or results in this being well incorporated into the surroundings, i.e. into the aircraft cabin. When using aluminium as the metal pigment, the resulting decorative varnish layer is, for example, of an attractive and pleasing silver-coloured hue. Moreover, the decorative varnish layer has a very high adhesive power, a long life and a high resistance to scratching. On account of the specific composition of the decorative varnish which is used, the decorative varnish layer is in addition of low combustibility/flammability. Furthermore, a very slight thickness of a decorative varnish layer as defined above is sufficient to achieve the described effects of the present invention.

Just like the entire rear-illuminable aircraft interior component according to the invention, the polyurethane varnishes which are used within the scope of the present invention to produce the translucent varnish layer and the decorative varnish layer should preferably be flight-approved and, in particular, meet the stringent fire protection requirements. The rear-illuminable aircraft interior component according to the invention should in particular comply with the fire protection requirements for civil aviation and according to ABD 0031 (Airbus standard).

Generally speaking, any desired light source can be used as the rear illumination means for the aircraft interior component according to the invention. However coloured and/or dimmable light sources, in particular LEDs which can be adjusted in colour, are preferred within the scope of the present invention.

The aircraft interior component according to the invention can in particular be used as an aircraft window frame or enclosure, also called aircraft window ring or decorative ring in the following. In order to produce a decorative ring of this kind, the thermoplastic defined above is firstly shaped into the required form and then coated with a translucent varnish as described above and subsequently with a decorative varnish as described above. The rear-illuminable decorative ring which is thus produced can then be installed in an aircraft cabin and illuminated from the rear by means of a light source which is disposed behind the rear-illuminable decorative ring. The rear illumination appropriately takes place by means of LEDs, which are preferably not placed directly behind the decorative window ring, but rather laterally of this. The radiation which is generated by the light source is then directed by a reflector which is disposed behind the decorative window ring or a screen which is disposed behind the decorative ring onto the decorative window ring so that this is uniformly illuminated and the individual LEDs do not stand out. The light source is preferably coloured and dimmable, so that the ambience of the aircraft cabin can be positively influenced. The window ring can also be adapted to a certain airline company by setting different colours of colour effects.

The present invention is illustrated in detail in the following by way of an example.

EXAMPLE

Production of an Aircraft Window Ring

In order to obtain the desired form, a EUROPLEX® PPSU plate (firm Röhm GmbH, Darmstadt) was firstly shaped by means of a thermoforming method and then trimmed. The resulting window ring blank, which has a dark effect when not illuminated from the rear, was then varnished with a translucent varnish based on polyurethane of the hue "nuance milky white". This translucent polyurethane varnish comprises titanium dioxide with a particle size of 0.1 to 1.0 µm and a refractive index of 2.7, glass particles with a particle size of 4.71 µm and a refractive index of 1.84 and titanium dioxide mica particles with a particle size of less than 40 µm for at least 90% of the particles. A decorative varnish based on polyurethane, comprising aluminium particles with a particle size of less than 25 µm and mica with a particle size in the range from 10 to 60 µm, was subsequently applied. Following varnishing, the aircraft window ring which was obtained was installed as shown in FIG. 1 and FIG. 2 in an aircraft cabin and illuminated from the rear by means of a light source such as Linearlight Flex LEDs (OS-LM 10A; firm Osram).

DETAILED DESCRIPTION OF THE PREFERRED EMBODIMENT

Figure 1:
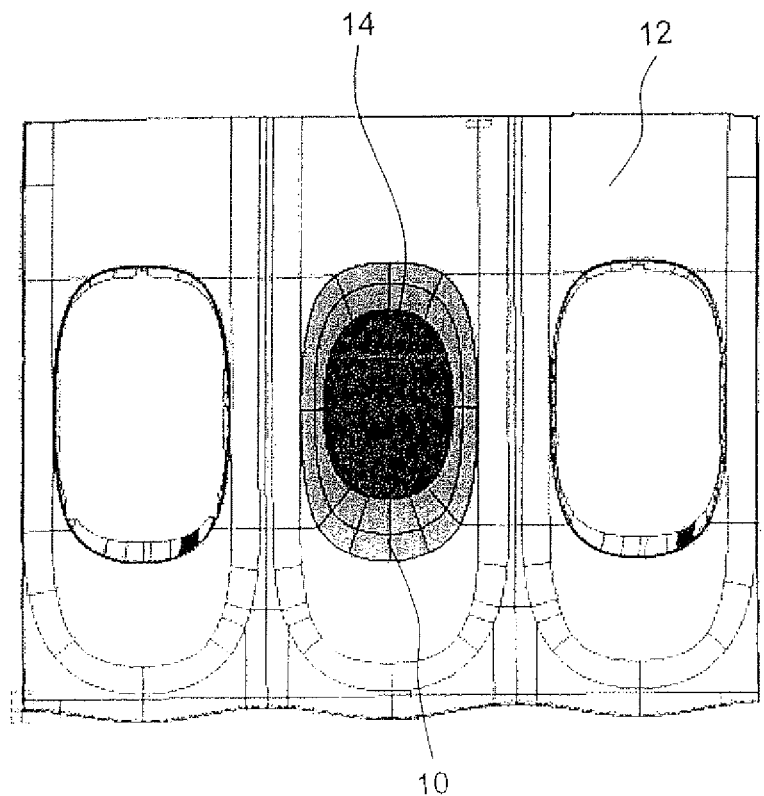
FIG. 1 is a front perspective view of a window ring and window according to an embodiment of the invention.
Figure 2:
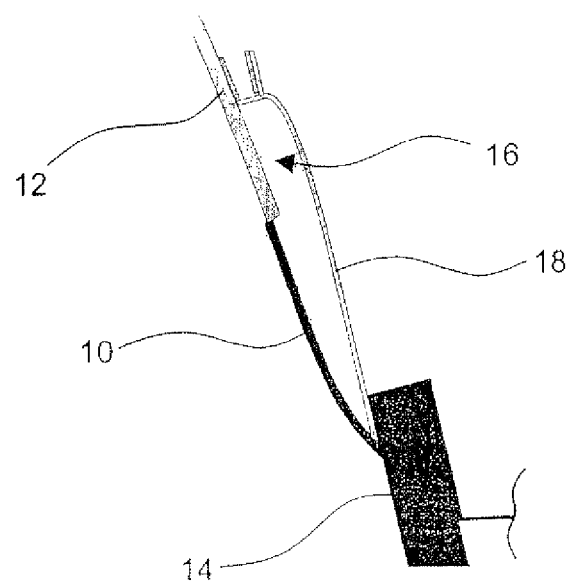
FIG. 2 is a cross-sectional view of the window ring and window of FIG. 1.

In this respect FIG. 1 shows a rear-illuminable aircraft window ring 10 according to the invention which is installed in cabin paneling 12 and encloses a window pane 14. FIG. 2 is a cross-sectional view and shows a part of the aircraft window 14 with the aircraft window ring 10 according to the invention. One or more light source(s) (not represented) is/are preferably disposed in an area 16 which is not located directly behind the aircraft window ring 10, but rather laterally outside of this. The radiation coming from the light source or sources is directed by a reflector 18 onto the aircraft window ring 10 and results in the latter being uniformly diffusely illuminated from the rear.

The invention claimed is:

1. A rear-illuminable aircraft interior component consisting of a transparent or translucent thermoplastic, a translucent varnish layer disposed on the transparent or translucent thermoplastic and a decorative varnish layer disposed on the translucent varnish layer, in which the translucent varnish layer is obtained by applying a translucent, solvent-containing two-component polyurethane varnish which comprises an inorganic pigment and a refractive component, wherein the inorganic pigment has a particle size in the range from 0.2 to 1.0 µm and the refractive component has a particle size in the range from 4.0 to 5.5 µm such that the refractive component has a larger particle size than the inorganic pigment in the translucent varnish layer wherein the transparent or translucent thermoplastic is a polyphenylsulphone thermoplastic and the decorative varnish layer is obtained by applying a solvent-containing two-component polyurethane varnish.

2. The rear-illuminable aircraft interior component according to claim 1, in which the translucent, solvent-containing two-component polyurethane varnish also comprises a glossy pigment.

3. The rear-illuminable aircraft interior component according to claim 2, in which the glossy pigment has a particle size of less than 60 µm.

4. The rear-illuminable aircraft interior component according to claim 2, in which the glossy pigment is mica.

5. The rear-illuminable aircraft interior component according to claim 1, in which the inorganic pigment has a refractive index in the range from 2.5 to 3.1.

6. The rear-illuminable aircraft interior component according to claim 1, in which the pigment is titanium dioxide.

7. The rear-illuminable aircraft interior component according to claim 1, in which the refractive component has a refractive index of 1.5 to 2.1.

8. The rear-illuminable aircraft interior component according to claim 1, in which glass particles are used as the refractive component.

9. The rear-illuminable aircraft interior component according to claim 1, in which the decorative varnish layer is obtained by applying a solvent-containing metallic two-component-polyurethane varnish which comprises a metal pigment.

10. The rear-illuminable aircraft interior component according to claim 9, in which the solvent-containing metallic two-component polyurethane varnish also comprises a pearlescent pigment.

11. The rear-illuminable aircraft interior component according to claim 10, in which the pearlescent pigment has a particle size in the range from 10 to 60 µm.

12. The rear-illuminable aircraft interior component according to claim 10, in which the pearlescent pigment is mica.

13. The rear-illuminable aircraft interior component according to claim 9, in which the metal pigment has a particle size of less than 25 µm.

14. The rear-illuminable aircraft interior component according to claim 9, in which the metal pigment is selected from the group consisting of aluminium, copper, gold bronze, silver, gold, cobalt, titanium, tin and mixtures thereof.

15. The rear-illuminable aircraft interior component according to claim 1, in which the decorative varnish layer is obtained by applying a solvent-containing two-component polyurethane varnish which comprises an inorganic or organic pigment.

16. The rear-illuminable aircraft interior component according to claim 1, in which the aircraft interior component is an aircraft window ring.

17. The rear-illuminable aircraft interior component according to claim 16, wherein the transparent or translucent thermoplastic is shaped from a sheet so as to define the shape of the aircraft window ring.

18. A process of using a rear-illuminable aircraft interior component in an aircraft having a window, the process comprising:
    providing a rear-illuminable aircraft interior component consisting of a transparent or translucent thermoplastic, a translucent varnish layer disposed on the transparent or translucent thermoplastic and a decorative varnish layer disposed on the translucent varnish layer, in which the translucent varnish layer is obtained by applying a translucent, solvent-containing two-component polyurethane varnish which comprises an inorganic pigment and a refractive component wherein the transparent or translucent thermoplastic is a polyphenylsulphone thermoplastic and the decorative varnish layer is obtained by applying a solvent-containing two-component polyurethane varnish; and
    installing the rear-illuminable aircraft interior component around the window to form an aircraft window ring,
    wherein the inorganic pigment has a particle size in the range from 0.2 to 1.0 µm and the refractive component has a particle size in the range from 4.0 to 5.5 µm such that the refractive component has a larger particle size than the inorganic pigment in the translucent varnish layer.

* * * * *